US010596652B2

(12) United States Patent
Trinkner

(10) Patent No.: US 10,596,652 B2
(45) Date of Patent: Mar. 24, 2020

(54) SYSTEMS AND METHODS FOR FUEL LEVEL MONITORING IN AN ENGINE-DRIVEN GENERATOR

(71) Applicant: ILLINOIS TOOL WORKS INC., Glenview, IL (US)

(72) Inventor: Michael John Trinkner, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 116 days.

(21) Appl. No.: 14/540,713

(22) Filed: Nov. 13, 2014

(65) Prior Publication Data

US 2016/0136747 A1 May 19, 2016

(51) Int. Cl.
| | | |
|---|---|---|
| *B23K 9/10* | (2006.01) | |
| *G01F 9/00* | (2006.01) | |
| *F02M 51/00* | (2006.01) | |
| *G01F 23/00* | (2006.01) | |

(52) U.S. Cl.
CPC ......... *B23K 9/1006* (2013.01); *F02M 51/005* (2013.01); *G01F 9/008* (2013.01); *G01F 23/00* (2013.01)

(58) Field of Classification Search
CPC ...... B23K 9/013; B23K 9/1006; B23K 9/173; B23K 9/32; B23K 9/00; F02B 63/048
USPC ....................................................... 219/133
See application file for complete search history.

(56) References Cited

U.S. PATENT DOCUMENTS

| | | | |
|---|---|---|---|
| 1,929,887 A | 10/1933 | Gustafson | |
| 2,836,736 A | 5/1958 | Johnson | |
| 2,999,950 A | 9/1961 | Johnson | |
| 3,227,979 A | 1/1966 | Kamp | |
| 3,514,219 A | 5/1970 | Mitchell | |
| 3,659,183 A | 4/1972 | Carlson | |
| 3,858,686 A | 1/1975 | Luterick | |
| 4,367,130 A | 1/1983 | Lemelson | |
| 4,403,466 A | 9/1983 | Tillotson | |
| 4,475,380 A * | 10/1984 | Colovas | ............. B60R 16/0236 73/114.53 |
| 4,667,141 A | 5/1987 | Steele | |

(Continued)

FOREIGN PATENT DOCUMENTS

| | | |
|---|---|---|
| DE | 4203854 | 9/1992 |
| EP | 0041585 | 12/1981 |

(Continued)

OTHER PUBLICATIONS

Japanese to English machine translation of JP 2005-061287.*

(Continued)

*Primary Examiner* — Michael G Hoang
(74) *Attorney, Agent, or Firm* — McAndrews, Held & Malloy, Ltd.

(57) ABSTRACT

An engine-driven welding generator that monitors fuel level is provided. The engine-driven welding generator comprises a fuel level monitoring system configured to measure a remaining fuel level in a fuel tank of the engine-driven welding generator, determine a rate of fuel usage of an engine of the engine-driven welding generator, and calculate a remaining run time of the engine based on the remaining fuel level and the rate of fuel usage of the engine.

14 Claims, 3 Drawing Sheets

(56) References Cited

U.S. PATENT DOCUMENTS

| | | | |
|---|---|---|---|
| 4,771,152 A * | 9/1988 | Eke | F24C 7/087 |
| | | | 219/681 |
| 4,799,039 A | 1/1989 | Balcom | |
| 5,277,554 A | 1/1994 | Elson | |
| 5,341,644 A | 8/1994 | Nelson | |
| 5,410,126 A | 4/1995 | Miller | |
| 5,449,140 A | 9/1995 | Lastowski | |
| 5,510,596 A * | 4/1996 | Xu | B23K 31/006 |
| | | | 219/124.34 |
| 5,522,475 A | 6/1996 | Thompson | |
| 5,591,362 A | 1/1997 | Feldhausen | |
| 5,602,462 A | 2/1997 | Stich | |
| 5,694,780 A | 12/1997 | Alsenz | |
| 5,713,318 A | 2/1998 | Tausk | |
| 5,767,661 A | 6/1998 | Williams | |
| 5,907,970 A | 6/1999 | Havlovick | |
| 5,928,535 A | 7/1999 | Trinkner | |
| 6,051,809 A | 4/2000 | Colella | |
| 6,099,265 A | 8/2000 | Rowe, Jr. | |
| 6,172,332 B1 | 1/2001 | Trinkner | |
| 6,172,432 B1 * | 1/2001 | Schnackenberg | H02J 3/14 |
| | | | 307/125 |
| 6,204,639 B1 | 3/2001 | Takano | |
| 6,263,926 B1 | 7/2001 | Bender | |
| 6,296,027 B1 | 10/2001 | Bender | |
| 6,331,694 B1 | 12/2001 | Blankenship | |
| 6,363,905 B1 | 4/2002 | Davis | |
| 6,471,488 B2 | 10/2002 | Nolan | |
| 6,472,635 B2 | 10/2002 | Trinkner | |
| 6,534,958 B1 | 3/2003 | Graber | |
| 6,547,527 B2 | 4/2003 | Gaither | |
| 6,596,972 B1 | 7/2003 | Di Novo | |
| 6,603,097 B2 | 8/2003 | Leisner | |
| 6,619,337 B1 | 9/2003 | Vickers | |
| 6,652,401 B2 | 11/2003 | Liu | |
| 6,660,967 B2 | 12/2003 | Brofft | |
| 6,670,580 B2 | 12/2003 | Brofft | |
| 6,674,046 B2 | 1/2004 | Bankstahl | |
| 6,753,503 B2 | 6/2004 | Bankstahl | |
| 6,818,860 B1 | 11/2004 | Stava | |
| 6,833,683 B2 | 12/2004 | Winkler | |
| 6,876,096 B2 | 4/2005 | DuPlessis | |
| 6,883,540 B2 | 4/2005 | Bankstahl | |
| 6,933,465 B2 | 8/2005 | Bankstahl | |
| 6,989,509 B2 | 1/2006 | Silvestro | |
| 6,992,265 B2 | 1/2006 | Bender | |
| 7,098,424 B2 | 8/2006 | Silvestro | |
| 7,211,764 B2 | 5/2007 | Leisner | |
| 7,261,522 B2 | 8/2007 | Bankstahl | |
| 7,403,850 B1 | 7/2008 | Boutin | |
| 7,741,815 B2 | 6/2010 | Cassidy | |
| 8,604,385 B2 | 12/2013 | Leisner | |
| 8,653,415 B2 | 2/2014 | Fosbinder | |
| 8,759,714 B2 | 6/2014 | Fosbinder | |
| 8,766,139 B2 | 7/2014 | Kropp | |
| 8,921,735 B2 | 12/2014 | Helf | |
| 9,000,328 B2 | 4/2015 | Helf | |
| 2003/0042237 A1 | 3/2003 | Brofft | |
| 2003/0085254 A1 | 5/2003 | Katooka | |
| 2003/0189492 A1 * | 10/2003 | Harvie | A61M 16/0051 |
| | | | 340/573.1 |
| 2004/0168653 A1 * | 9/2004 | Radtke | B23K 9/32 |
| | | | 123/2 |
| 2005/0133489 A1 | 6/2005 | Gitter | |
| 2005/0155959 A1 | 7/2005 | Bender | |
| 2005/0263513 A1 | 12/2005 | Leisner | |
| 2005/0263515 A1 | 12/2005 | Fosbinder | |
| 2006/0016791 A1 | 1/2006 | Fosbinder | |
| 2006/0027547 A1 | 2/2006 | Silvestro | |
| 2006/0028178 A1 | 2/2006 | Hobbs | |
| 2006/0037953 A1 | 2/2006 | Matthews | |
| 2006/0090552 A1 | 5/2006 | Ziegler | |
| 2006/0157459 A1 | 7/2006 | Fosbinder | |
| 2006/0215389 A1 | 9/2006 | Fosbinder | |
| 2007/0024246 A1 | 2/2007 | Flaugher | |
| 2007/0072014 A1 | 3/2007 | Kim | |
| 2007/0181547 A1 | 8/2007 | Vogel | |
| 2008/0047522 A1 | 2/2008 | Leisner | |
| 2008/0264919 A1 | 10/2008 | Helf | |
| 2008/0264921 A1 | 10/2008 | Kropp | |
| 2008/0264922 A1 | 10/2008 | Fosbinder | |
| 2008/0297103 A1 | 12/2008 | Windsor | |
| 2009/0101630 A1 * | 4/2009 | Trinkner | B23K 9/1006 |
| | | | 219/133 |
| 2009/0303059 A1 * | 12/2009 | Von Lintzgy | G01F 23/0076 |
| | | | 340/621 |
| 2010/0194356 A1 * | 8/2010 | Fosbinder | B23K 9/1006 |
| | | | 322/25 |
| 2011/0290765 A1 * | 12/2011 | Albrecht | B23K 9/00 |
| | | | 219/78.01 |
| 2012/0325792 A1 * | 12/2012 | Stein | B23K 9/32 |
| | | | 219/148 |
| 2016/0067809 A1 * | 3/2016 | Enyedy | B23K 9/1006 |
| | | | 219/133 |
| 2016/0161318 A1 * | 6/2016 | Pruzina | G01F 9/008 |
| | | | 340/870.05 |

FOREIGN PATENT DOCUMENTS

| | | |
|---|---|---|
| EP | 1459832 | 9/2004 |
| JP | 59099038 | 6/1984 |
| JP | 59100018 | 6/1984 |
| JP | 04325836 | 11/1992 |
| JP | 10115225 | 5/1998 |
| JP | 2005061287 | 3/2005 |
| JP | 2007001442 | 1/2007 |
| KR | 20040042175 | 5/2004 |
| WO | 0014392 | 3/2000 |
| WO | 2007142876 | 12/2007 |
| WO | 2008134182 | 11/2008 |
| WO | 2011060375 | 5/2011 |

OTHER PUBLICATIONS

Non-patent literature by "Portable Generator Master".*
Certified Truck Bodies Original Products; www.certifiedtruckbodies.com/pages_single/compressors.htm.
International Search Report from PCT application No. PCT/US2015/059392, dated Jan. 15, 2016, 13 pgs.
The Space Saver by Certified Truck Bodies; www.certifiedtruckbodies.com.

* cited by examiner

US 10,596,652 B2

SYSTEMS AND METHODS FOR FUEL LEVEL MONITORING IN AN ENGINE-DRIVEN GENERATOR

BACKGROUND

The invention relates generally to engine-driven generators, and, more particularly, to systems and methods for monitoring fuel level in an engine-driven generator.

Welding is a process that has become increasingly ubiquitous in various industries and applications. While such processes may be automated in certain contexts, a large number of applications continue to exist for manual welding operations, which often rely on the use of an engine-driven generator to power the welding process. Engine-driven generators typically include internal components, such as electrical circuitry, a generator, and an engine, which cooperate to produce a suitable power output for the welding operation. Such power outputs may be alternating current (AC) power or direct current (DC) power, depending on the welding operation being performed. Moreover, the power may be adapted for particular applications, such as metal inert gas (MIG) welding, tungsten inert gas (TIG) welding, stick welding, and so forth.

A liquid fuel is often used as a combustible material to operate the engine of an engine-driven generator. As will be appreciated, liquid fuel may be contained within a fuel tank of the engine-driven generator. The engine-driven generator may further include a fuel gauge, such as a sight gauge or electronic gauge, which indicates an approximate level of fuel remaining in the fuel tank. For example, the sight gauge or electronic gauge may indicate that the fuel tank is approximately ¼, ½, or ¾ full. Unfortunately, exiting fuel gauges do not provide operators with a more useful metric for indicating how much fuel is remaining in the fuel tank. Accordingly, there is a need for a system to more accurately and conveniently communicate a fuel level of the fuel tank in an engine-driven generator to an operator.

BRIEF DESCRIPTION

In one embodiment, an engine-driven generator includes an engine, a generator configured to be driven by the engine, a fuel tank configured to supply fuel to the engine, and a fuel level monitoring system configured to measure a remaining fuel level in the fuel tank, determine a rate of fuel usage of the engine, and calculate a remaining run time of the engine based on the remaining fuel level and the rate of fuel usage of the engine.

In another embodiment, a method includes measuring a remaining fuel level in a fuel tank of an engine-driven generator, determining a rate of fuel usage of the engine-driven generator, and calculating a remaining run time of the engine-driven generator based on the remaining fuel level and the rate of fuel usage of the engine-driven generator.

In another embodiment, a system includes an engine-driven welding generator having a fuel level monitoring system configured to measure a remaining fuel level in a fuel tank of the engine-driven welding generator, determine a rate of fuel usage of an engine of the engine-driven welding generator, and calculate a remaining run time of the engine based on the remaining fuel level and the rate of fuel usage of the engine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure are directed to a portable engine-driven welding generator with a fuel level monitoring system. Specifically, the fuel level monitoring system may be configured to calculate and communicate a predicted available run time remaining based on fuel level, load application, and/or other variables. For example, the fuel level monitoring system may determine an amount of fuel remaining in a fuel tank of the portable engine-driven welding generator, determine an amount of fuel usage of the portable engine-driven welding generator at a current load or during a previous time period, and then calculate an amount of remaining time that the portable engine-driven welding generator may operate based on the amount of fuel remaining. The calculated run time remaining may then be displayed on a display or user interface to provide a user with a useful metric indicating the amount of fuel remaining in the fuel tank of the portable engine-driven welding generator.

Figure 1:
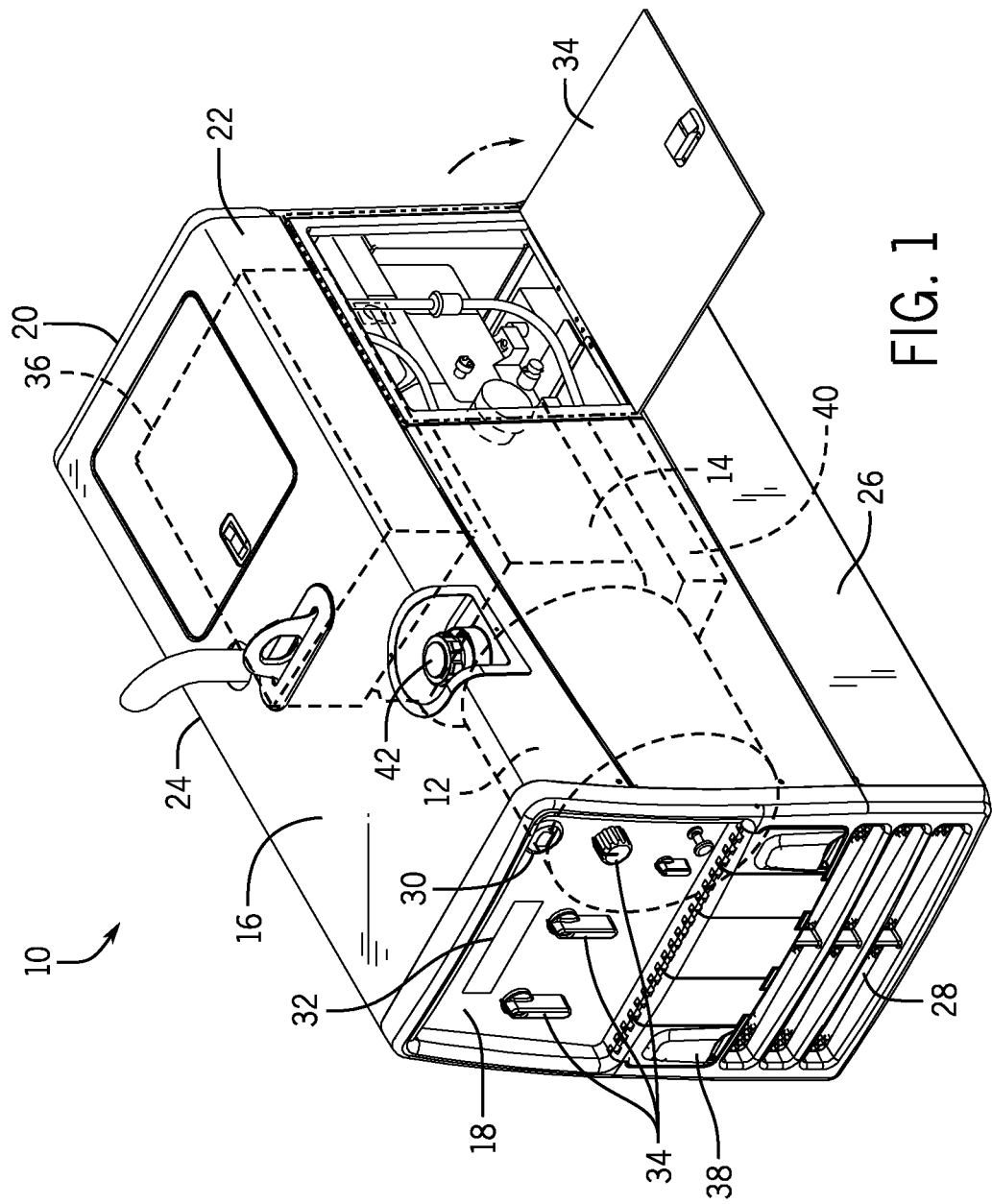
FIG. 1 is a perspective view of an embodiment of a portable engine-driven welding generator system which may employ devices for monitoring fuel level, in accordance with aspects of the present disclosure.

Referring now to the drawings, FIG. 1 illustrates a portable engine-driven welding generator system 10 having a generator 12 drivingly coupled to an engine 14 in an enclosure 16 in accordance with an exemplary embodiment of the present technique. As discussed in detail below, the system 10 may include a fuel level monitoring system configured to indicate a remaining running time of the welding generator system 10 based on a fuel level of the welding generator system 10. For example, the system 10 may include a system configured to measure an amount of fuel in a fuel tank of the system 10 and subsequently calculate a remaining running time of the system 10 based on previous and/or current loads of the system 10. As will be appreciated, the disclosed embodiments may be used in a variety of electromechanical systems, including welding systems, non-welding systems, motor-generator systems, and so forth.

The enclosure 16 includes multiple functionalities in one portable system to improve productivity and reduce space consumption. Specifically, the system 10 is configured to output electrical power for a variety of applications, including welding, cutting, battery charging, jump starting, and so forth. Moreover, the system 10 includes intelligence (e.g., logic in software and/or hardware) to adjust the outputs based on various feedback of the system 10 and an external device receiving the electrical power from the system 10. For example, the system 10 does not randomly provide output power for welding and/or charging, but rather the system 10 analyzes various parameters, executes various logic, and intakes sensed feedback to make an intelligent decision regarding the output. In some embodiments, however, the system 10 may provide output power without adjustment or analysis of any parameters or feedback. The enclosure 16 includes a front panel 18, a rear panel 20, a right side 22, and a left side 24, all engaging a base 26 to complete the enclosure 16. The enclosure 16 protects the engine 14 and the generator 12 from dust, debris, and rough handling. The enclosure 16 also reduces noise and helps to cool the engine 14 by preventing hot air recirculation via a cool air inlet 28 on the front panel 18 by pulling air through the interior volume of the enclosure 16. In certain embodiments, the rear panel 20 may also include an air inlet for air intake and/or exhaust flow.

A control system regulates the electrical power supplied by the generator 12 and allows for it to be used for a welding process and/or auxiliary power to other devices or tools. The front panel 18 may include various control inputs, indicators, displays, electrical outputs, and so forth. In one embodiment, the front panel 18 may include various indicators 30 to provide feedback to the user. For example, the indicator 30 may include a display (e.g., LCD) 32 to display voltage, amperage, air pressure, and the like. As discussed in detail below, the display 32 may display a calculated remaining run time of the system 10 based on a measured amount of fuel in a fuel tank of the system 10 and/or based on a load of the system 10. Further, in some embodiments, a user input 34 may include a touch screen, knobs, and/or buttons configured for a mode of operation, an output level or type, etc. For instance, the user input 34 may include a dial rotatable to select a mode of operation, such as a DC weld, an AC weld, a battery charge, or a tool operation. Embodiments of the front panel 18 include any number of inputs and outputs, such as welding methods, oil pressure, oil temperature, and system power.

The engine 14 provides output power (e.g., a mechanical output) to drive the welding generator 12. In certain embodiments, the power from the engine 14 operates the generator 12 via a drive shaft. The drive shaft may be directly or indirectly coupled to one or more driven mechanisms. For example, an indirect coupling may include a belt and pulley system, a gear system, or a chain and sprocket system. In the present embodiment, the drive shaft couples directly to the generator 12. However, either arrangement can be used for the connection between the engine 14 and the generator 12.

In an embodiment, the engine 14 may include a combustion engine powered by gas or diesel, LP fuel, natural gas, or other fuel, and driving one or more drive shafts. For example, the engine 14 may include an industrial gas/diesel engine configured to output anywhere from about 9 horsepower (Hp) to about 30 Hp. Generally, the weight of such an engine 14 may vary with the size and Hp rating of the engine 14. For example, a 23 Hp engine may weigh approximately 100 lbs., whereas a similar 9 Hp engine may weigh less than approximately 50 lbs. Thus, the portable system 10 may benefit from the use of a smaller engine 14.

As discussed previously, embodiments may include a generator 12 coupled to the engine 14. Thus, the generator 12 may convert the power output (e.g., mechanical energy) of the engine 14 to an electrical power. Generally, the generator 12 includes a device configured to convert a rotating magnetic field into an electrical current (e.g., AC generator). The generator 12 includes a rotor (the rotating portion of the generator) and a stator (the stationary portion of the generator). For example, the rotor of the generator 12 may include the rotating drive shaft of the engine 14 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 12 may include a plurality of independent winding sections in the rotors and/or stators, such that the generator 12 is configured to output multiple electrical outputs having different characteristics. For example, the generator 12 may include a first section configured to drive a welding current to a welder and a second section configured to drive a current for other AC outputs. In some embodiments, multiple generators 12 may be connected to the drive shaft.

As depicted in FIG. 1, the enclosure 16 includes various access panels to enable servicing, repair, and so forth. For example, a side access panel 34 is configured to attach to opposite sides of the enclosure 16. The top of the enclosure 16 includes an access panel or hatch 36, which are both rotatable between open and closed positions above the components of the system 10. The top hatch 36 can rotate open to enable access to the engine 14. Similarly, the side access panel 34 can rotate open to enable access to the engine 14, oil filter, spark plugs, etc.

The illustrated system 10 also includes various external connections 38. The external connections 38 may include various outlets and couplers configured to provide access to the electrical power generated by the system 10. For example, the external connections 38 may include an AC power output and a DC power output, which may be coupled to various devices and tools. For example, the AC power output may provide auxiliary power to various devices or tools integrated within or coupled to the system 10. The DC power output can be coupled to various welding and cutting tools, such as a welding torch. The welding devices may receive current from the generator 12 via the external connections 38. As will be appreciated, the torch may include various welding devices, such as a TIG (tungsten inert gas) torch, a MIG (metal inert gas) gun, or a plasma cutting torch. The system 10 may also include welding cable connecting the torch to the external connections 38. Further, the system 10 may include other components necessary for operation of a welding device, such as a wire feeder, a shielding gas supply, and/or any other component, or combination thereof.

The system 10 also includes a fuel tank 40 that holds fuel to be provided to the engine 14. The fuel tank 40 includes an opening for adding fuel to the fuel tank 40. A fuel cap 42 is used to cover the opening of the fuel tank 40 and enable access to the fuel tank 40 for refueling. As mentioned above, the control system of the system 10 is configured to calculate a remaining running time of the welding generator system 10 based on a fuel level in the fuel tank 40 of the welding generator system 10. As discussed in detail below, the control system may use a measured fuel level in the fuel tank 40 and subsequently calculate a remaining running time of the system 10 using a past, current, or other measured load of the system 10. Thereafter, the calculated remaining running time of the system 40 may be displayed with the display 32 on the front panel 18 of the system 10 and/or may be displayed or communicated to an operator in another manner.

Figure 2:
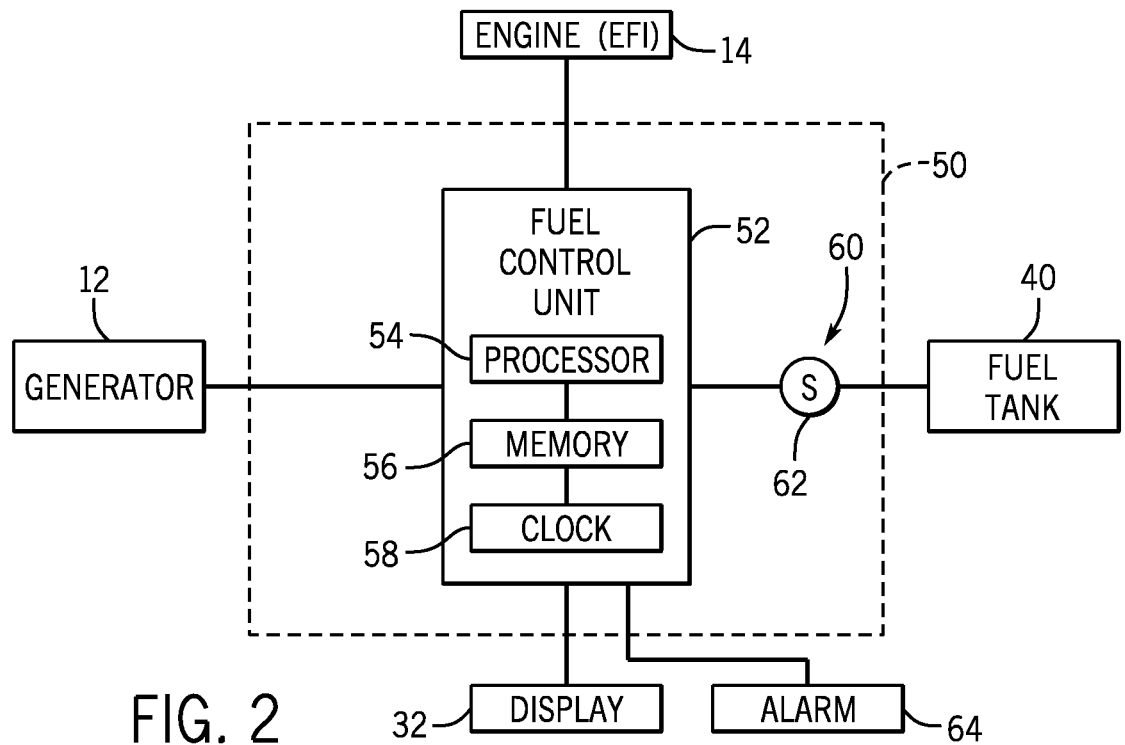
FIG. 2 is a schematic of an embodiment of a fuel level monitoring system of the portable engine-driven welding generator system.

FIG. 2 is a schematic illustrating an embodiment of a control system 50 (e.g., a fuel level monitoring system), which may be integrated with the system 10. As mentioned above, the control system 50 may be configured to measure a fuel level in the fuel tank 40 of the system 10, calculate a remaining running time of the system 10 based on the fuel level in the fuel tank 40 and based on a recent fuel usage of the system 10, and then communicate the remaining running time of the system 10 to an operator of the system 10. In the illustrated embodiment, the control system 50 is configured for use with the engine 14 of the system 10, where the engine 14 is an electronic fuel injection engine.

As shown, the control system 50 includes a fuel control unit 52 (e.g., an electronic control unit). The fuel control unit 52 includes a processor 54, a memory 56, and an internal clock 58. As will be appreciated, the fuel control unit 52 may be a component of the electronic fuel injection system of the engine 14. However, in other embodiments, the fuel control unit 52 may be a separate component that is integrated with the engine 14 or with another part of the system 10. The control system 50 also includes one or more sensors 60, such as a fuel sensor 62 (e.g., a fuel gauge sending unit).

In operation, the fuel control unit 52 may receive a fuel level measurement from the fuel sensor 62. That is, the fuel sensor 62 may communicate the level of fuel remaining in the fuel tank 40 at a given time. The fuel control unit 52 also monitors an average fuel usage of the system 10 over a predetermined amount of time. For example, the fuel control unit 52 may continually measure remaining fuel levels detected by the fuel sensor 62 and store the fuel levels with a time stamp (e.g., determined by the internal clock 58) in the memory 56. Thereafter, the processor 54 may use the recorded fuel levels and associated time stamps to calculate a fuel usage during the predetermined amount of time. The predetermined amount of time for which fuel usage is measured may further be adjustable by the user or operator. For example, the predetermined amount of time may be approximately 2 minutes, 5 minutes, 10 minutes, or any other suitable amount of time.

Based on the current fuel level measured by the fuel sensor 62 and the fuel usage during the predetermined amount of time, the processor 54 may then calculate a remaining running time of the system 10. The calculated remaining run time of the system 10 is then communicated to the operator or user with the display 32 or in another manner. For example, the display 32 may display that the system 10 has 5 minutes, 10 minutes, 30 minutes, 1 hour, 1 hour and 30 minutes, etc., of running time remaining until the fuel tank 40 is empty. Additionally, in certain embodiments, the system 10 may include an alarm 64. For example, the alarm 64 may be a visual alarm, such as an LED, and/or an audible alarm, such as a speaker or horn. The fuel control unit 52 may activate the alarm when the calculated remaining run time reaches a predetermined threshold. For example, the alarm 64 may be activated when a remaining run time of the system 10 reaches and/or falls below 30 minutes.

Figure 3:
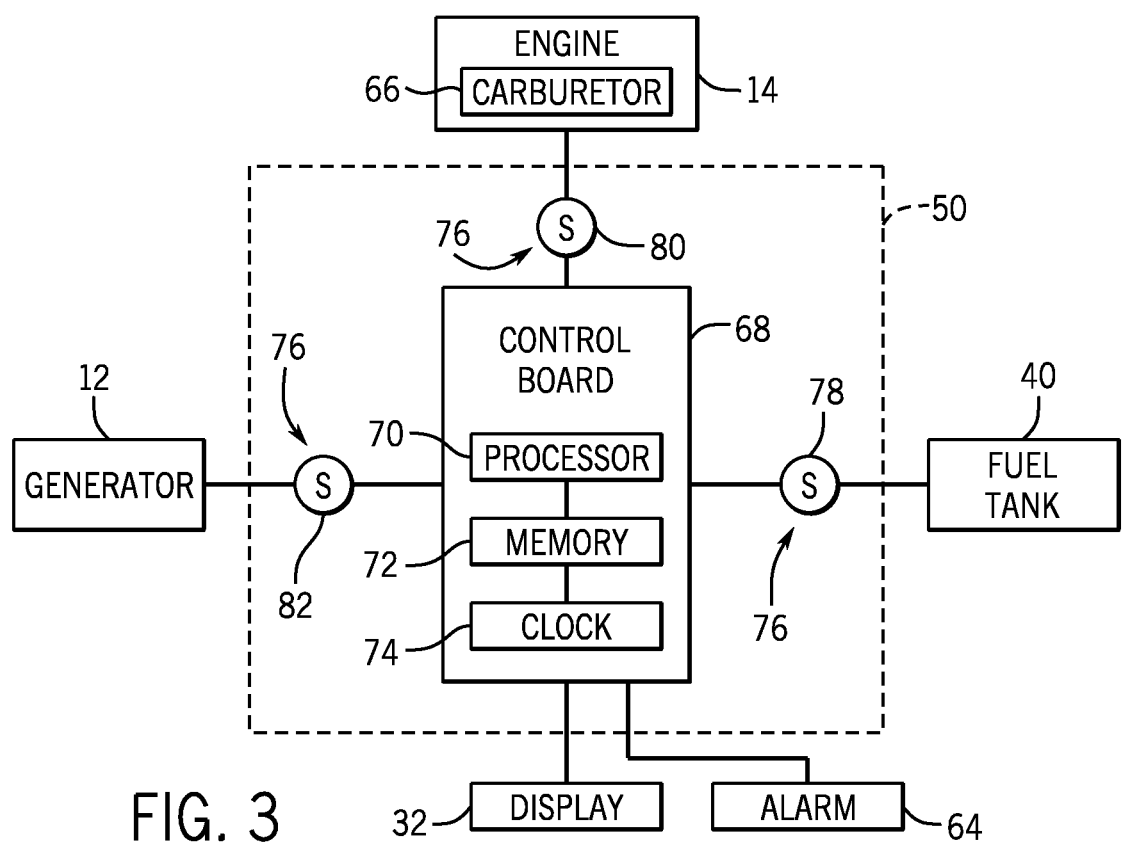
FIG. 3 is a schematic of an embodiment of a fuel level monitoring system of the portable engine-driven welding generator system.

FIG. 3 is a schematic illustrating an embodiment of the control system 50 (e.g., a fuel level monitoring system), which may be integrated with the system 10. As mentioned above, the control system 50 may be configured to measure a fuel level in the fuel tank 40 of the system 10, calculate a remaining running time of the system 10 based on the fuel level in the fuel tank 40 and based on a load on the system 10, and then communicate the remaining running time of the system 10 to an operator of the system 10. In the illustrated embodiment, the control system 50 is configured for use with the engine 14 of the system 10, where the engine 14 includes a carburetor 66.

As shown, the control system 50 includes a control board 68 (e.g., a printed circuit board). The control board 68 includes a processor 70, a memory 72, and an internal clock 74. The control system 50 also includes a variety of sensors 76. Specifically, the control system 50 includes a fuel sensor 78, an engine output sensor 80, and a generator output sensor 82. In the manner described below, the control board 68 utilizes feedback from the variety of sensors 76 to calculate an estimated remaining running time of the system 10.

In operation, the control board 68 may receive a fuel level measurement from the fuel sensor 78. That is, the fuel sensor 78 may communicate the level of fuel remaining in the fuel tank 40 at a given time. The control board 68 may continually measure remaining fuel levels detected by the fuel sensor 78 and store the fuel levels with a time stamp (e.g., determined by the internal clock 74) in the memory 72. The control board 68 may also records a detected power output of the engine 14 and/or the generator 12 during operation of the system 10. For example, the engine output sensor 80 may measure a speed (e.g., revolutions per minute) of an output shaft of the engine 14. Additionally or alternatively, the generator output sensor 82 may measure an output of the generator 12, such as an output current of the generator 12.

To determine the estimate running time remaining of the system 10, the processor 70 of the control board 68 may correlate a measured output of the engine 14 and/or the generator 12 with a fuel usage value, as determined by a fuel usage map. Specifically, a fuel usage map may be stored on the memory 72, and the fuel usage map may include a list of engine 14 and/or generator 12 outputs, where each engine 14 and/or generator 12 output has a correlating fuel usage rate (e.g., gallons/minute, liters/minute, etc.). Accordingly, the processor 70 may map the measured output of the engine 14 and/or generator 12 to a current fuel usage rate of the engine 14. Thereafter, the processor 70 may use the current fuel usage rate and the measured remaining fuel in the fuel tank 40 (e.g., measured by the fuel sensor 78) to calculate an estimated running time remaining of the system 10.

The estimated remaining run time of the system 10 calculated by the processor 70 is then communicated to the operator or user with the display 32 or in another suitable manner. For example, the display 32 may display that the system 10 has 5 minutes, 10 minutes, 30 minutes, 1 hour, 1 hour and 30 minutes, etc., of running time remaining until the fuel tank 40 is empty. Additionally, in the illustrated embodiment, the system 10 also includes the alarm 64. As discussed above, the alarm 64 may be a visual alarm, such as an LED, and/or an audible alarm, such as a speaker or horn. The control board 68 may activate the alarm when the calculated remaining run time reaches a predetermined threshold. For example, the alarm 64 may be activated when a remaining run time of the system 10 reaches and/or falls below 30 minutes.

Figure 4:
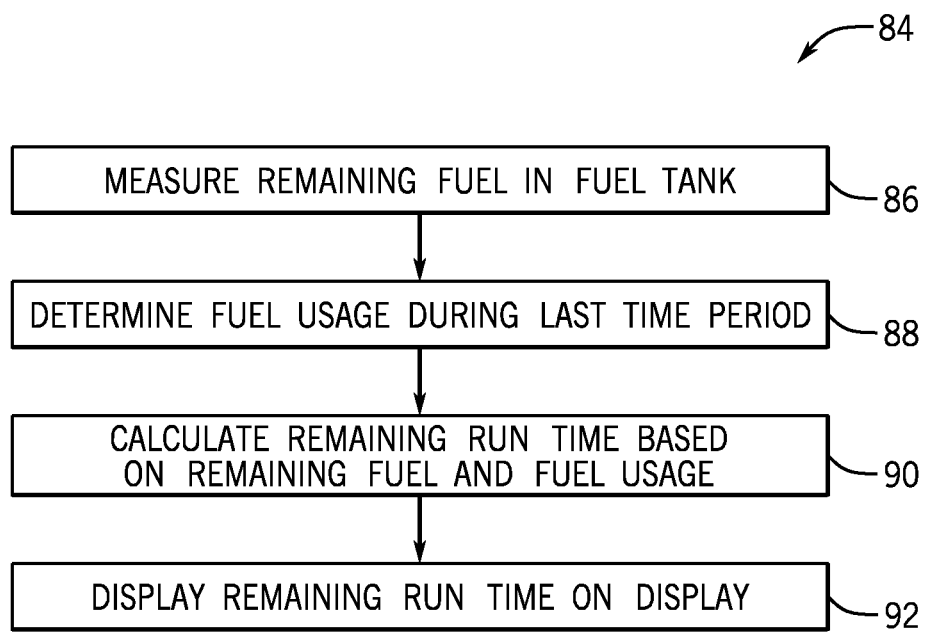
FIG. 4 is a method for monitoring a fuel level in the portable engine-driven welding generator system.

FIG. 4 is a flow chart of a method 84 for determining an estimated running time remaining for the system 10. As described below, the method 84 may be completed using the embodiment of the control system 50 (e.g., fuel level monitoring system) described with reference to FIG. 2 (i.e., engine 14 is electronically fuel injected), the embodiment of the control system 50 described with reference to FIG. 3 (i.e., engine 14 includes carburetor 66), or another suitable embodiment of the control system 50 and engine 14.

First, as indicated by block 86, the amount of fuel remaining in the fuel tank 40 of the system 10 is measured. As discussed above, the level of fuel remaining in the fuel tank 40 may be measured by a fuel sensor (e.g., fuel sensor 62 or 78). The measured amount of remaining fuel may be stored within a memory of the control system 50, such as the memory 56 of the fuel control unit 52 or the memory 72 of the control board 68.

Subsequently, as indicated by block 88, the amount of fuel used by the engine 14 during a previous time period or at a current load is then determined. For example, in the embodiment of the control system 50 having the fuel control unit 52, the fuel control unit 52 may continually measure remaining fuel levels detected by the fuel sensor 62 and store the fuel levels with a time stamp (e.g., determined by the internal clock 58) in the memory 56. Thereafter, the processor 54 may use the recorded fuel levels and associated time stamps to calculate a fuel usage during the predetermined amount of time. Alternatively, in the embodiment of the control system 50 having the control board 68, the processor 70 of the control board 68 may correlate a measured output of the engine 14 and/or the generator 12 (e.g., measured by engine output sensor 80 and/or generator output sensor 82) with a fuel usage value, as determined by a fuel usage map stored on the memory 72 of the control board 68.

Once the level of fuel remaining in the fuel tank 40 and the fuel usage of the engine 14 are determined by the control system 50, the processor of the control system 50 (e.g., processor 54 or 70) may then calculate an estimated remaining run time of the system 10, as indicated by block 90. Once the estimated running time remaining is calculated, the value of the running time remaining may be communicated to a user or operator. For example, as indicated by block 92, the remaining run time may be displayed on the display 32 of the system 10. In certain embodiments, the control system 50 may also activate an alarm (e.g., alarm 64) of the system 10 when the running time remaining falls below a predetermined threshold.

As described in detail above, embodiments of the present disclosure are directed to the portable engine-driven welding generator system 10 with the fuel level monitoring system 50. Specifically, the fuel level monitoring system 50 may be configured to calculate and communicate a predicted available run time remaining based on fuel level, load application, and/or other variables. For example, the fuel level monitoring system 50 may determine an amount of fuel remaining in the fuel tank 40 of the portable engine-driven welding generator system 10, determine an amount of fuel usage of the portable engine-driven welding generator system 10 at current load or during a previous time period, and then calculate an amount of remaining time that the portable engine-driven welding generator system 10 may operate based on the amount of fuel remaining. The calculated run time remaining may then be displayed on the display 32 or user interface of the system 10 to provide a user with a useful metric indicating the amount of fuel remaining in the fuel tank 40 of the portable engine-driven welding generator system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An engine-driven welding generator comprising:
an engine;
a generator configured to be driven by the engine;
a fuel tank configured to supply fuel to the engine; and
a fuel level monitoring system comprising:
a memory configured to store a fuel usage map comprising a list of generator outputs or engine outputs, each generator output or engine output being correlated with a fuel usage rate;
a clock;
a fuel sensor configured to measure a remaining fuel level in the fuel tank and store the remaining fuel level in the memory with a corresponding timestamp determined by the clock; and
a processor configured to:
determine a rate of fuel usage using the fuel usage map and an output of the generator or the engine, and
calculate a remaining run time of the engine based on the remaining fuel level and the rate of fuel usage.

2. The engine-driven welding generator of claim 1, comprising a display configured to display the remaining run time of the engine calculated by the fuel level monitoring system.

3. The engine-driven welding generator of claim 1, wherein the processor is configured to determine the output of the generator or engine using a generator output sensor or an engine output sensor.

4. The engine-driven welding generator of claim 1, further comprising an alarm, wherein the fuel level monitoring system is configured to activate the alarm when the remaining run time of the engine falls below a predetermined threshold.

5. The engine-driven welding generator of claim 4, wherein the alarm comprises one or more of a visual alarm and or an auditory alarm.

6. A method, comprising:
measuring, via a fuel sensor, a remaining fuel level in a fuel tank of an engine-driven welding generator;
storing the remaining fuel level with a corresponding time stamp in a memory;
measuring an output of a generator or engine of the engine-driven welding generator via a generator output sensor or an engine output sensor;
determining, via a processor, a rate of fuel usage of the engine-driven welding generator using the output and one or more fuel usage rates of a fuel usage map, wherein the fuel usage map comprises a list of generator outputs and engine outputs, and wherein each generator output and engine output is correlated with a fuel usage rate; and
calculating, via the processor, a remaining run time of the engine-driven welding generator based on the remaining fuel level and the rate of fuel usage of the engine-driven welding generator.

7. The method of claim 6, comprising displaying the remaining run time of the engine-driven welding generator on a display of the engine-driven welding generator.

8. The method of claim 6, further comprising actuating an alarm of the engine-driven welding generator when the remaining run time of the engine-driven welding generator falls below a predetermined threshold.

9. The method of claim 8, wherein the alarm comprises one or more of a visual alarm and or an auditory alarm.

10. A system, comprising:
an engine-driven welding generator, comprising:
a fuel level monitoring system comprising:
a memory configured to store a fuel usage map comprising a list of generator outputs and engine outputs, each generator output and engine output being correlated with a fuel usage rate;
a clock;
a fuel sensor configured to measure a remaining fuel level in the fuel tank and store the remaining fuel level in the memory with a corresponding timestamp determined by the clock; and
a processor configured to:
determine a rate of fuel usage of the engine-driven welding generator using the fuel usage map and an output of a generator or engine of the engine-driven welding generator, and calculate a remaining run time of the engine based on the remaining fuel level and the rate of fuel usage.

11. The system of claim 10, wherein the engine comprises an electronically fuel injected engine.

12. The system of claim 10, wherein the engine-driven welding generator comprises a display configured to display the remaining run time of the engine.

13. The system of claim 10, further comprising an alarm, wherein the fuel level monitoring system is configured to activate the alarm when the remaining run time of the engine falls below a predetermined threshold.

14. The system of claim 13, wherein the alarm comprises one or more of a visual alarm or an auditory alarm.

* * * * *

UNITED STATES PATENT AND TRADEMARK OFFICE
CERTIFICATE OF CORRECTION

PATENT NO. : 10,596,652 B2
APPLICATION NO. : 14/540713
DATED : March 24, 2020
INVENTOR(S) : Michael John Trinkner It is certified that error appears in the above-identified patent and that said Letters Patent is hereby corrected as shown below:

In the Claims

Column 7, Line 59 (Claim 1) Please delete:
"a memory configured to store a fuel usage map comprising a list of generator outputs or engine outputs, each generator output or engine output being correlated with a fuel usage rate;"

And insert the following:
--a memory configured to store a fuel usage map comprising a list of generator outputs and/or engine outputs, each generator output and/or engine output being correlated with a fuel usage rate;--

Column 8, Line 2 (Claim 1) Please delete:
"determine a rate of fuel usage using the fuel usage map and an output of the generator or the engine, and calculate a remaining run time of the engine based on the remaining fuel level and the rate of fuel usage,"

And insert the following:
--determine a current fuel usage rate of the engine using the fuel usage map and an output of the generator and/or the engine, measured in the real-time by a generator output sensor and/or engine output sensor, and calculate a remaining run time of the engine based on the remaining fuel level and the current fuel usage rate of the engine.--

Column 8, Line 28 (Claim 6) Please delete:
"measuring an output of a generator or engine of the engine-driven welding generator via generator output sensor or an engine output sensor;
determining, via a processor, a rate of fuel usage of the engine-driven welding generator using the output and one or more fuel usage rates of a fuel usage map, wherein the fuel usage map comprises a list of generator outputs and engine outputs, and wherein each generator output and engine output is correlated with a fuel usage rate; and calculating, via the processor, a remaining run time of the engine-driven welding generator based on the remaining fuel level Signed and Sealed this
Twenty-fourth Day of January, 2023

Katherine Kelly Vidal
*Director of the United States Patent and Trademark Office* and the rate of fuel usage of the engine-driven welding generator."

And insert the following:
--measuring an output of a generator and/or engine of the engine-driven welding generator via a generator output sensor and/or an engine output sensor;
determining, via a processor, a current fuel usage rate of the engine-driven welding generator using the measured output of the generator and/or engine and one or more fuel usage rates of a fuel usage map, wherein the fuel usage map comprises a list of stored generator outputs and/or engine outputs; and
calculating, via the processor, a remaining run time of the engine-driven welding generator based on the remaining fuel level and the current fuel usage rate of the engine-driven welding generator.--

In Column 8, Line 51 (Claim 10) Please delete:
"a memory configured to store a fuel usage map comprising a list of generator outputs and engine outputs, each generator output and engine output being correlated with a fuel usage rate;"

And insert the following:
--a memory configured to store a fuel usage map comprising a list of generator outputs and/or engine outputs, each generator output and/or engine output being correlated with a fuel usage rate;--

In Column 8, Line 61 (Claim 10) Please delete:
"determine a rate of fuel usage of the engine-driven welding generator using the fuel usage map and an output of a generator or engine of the engine driven welding generator, and calculate a remaining a run time of the engine based on the remaining fuel level and the rate of fuel usage."

And insert the following:
--determine a current fuel usage rate of the engine-driven welding generator using the fuel usage map and an output of a generator and/or engine of the engine-driven welding generator, the output of the generator and/or engine measured in real-time by a generator output sensor and/or engine output sensor, and
calculate a remaining run time of the engine based on the remaining fuel level and the current fuel usage rate of the engine-driven welding generator.--

In Column 9, Line 4 (Claim 11) Please delete:
"an electronically fuel injected engine."

And insert the following:
--a carburetor.--